United States Patent [19]
Golden et al.

[11] 4,078,968
[45] Mar. 14, 1978

[54] SEALED HEAD ACCESS AREA ENCLOSURE

[75] Inventors: Martin P. Golden, Trafford; Aldo R. Govi, Greensburg, both of Pa.

[73] Assignee: The United States Government as represented by the U. S. Department of Energy, Washington, D.C.

[21] Appl. No.: 709,351

[22] Filed: Jul. 28, 1976

[51] Int. Cl.² .......................................... G21C 13/06
[52] U.S. Cl. ...................................... 176/87; 176/38
[58] Field of Search .............................. 176/37, 38, 87

[56] References Cited

U.S. PATENT DOCUMENTS

| | | | |
|---|---|---|---|
| 2,821,325 | 1/1958 | Chapellier et al. | 176/87 X |
| 3,318,780 | 5/1967 | Bohmann et al. | 176/87 |
| 3,514,115 | 5/1970 | Gallo | 176/87 X |
| 3,752,738 | 8/1973 | Naymark | 176/87 |
| 3,937,651 | 2/1976 | Schabert et al. | 176/87 X |
| 3,987,860 | 10/1976 | Jabsen | 176/87 |
| 4,022,656 | 5/1977 | Durston et al. | 176/87 X |

Primary Examiner—Peter A. Nelson
Attorney, Agent, or Firm—Dean E. Carlson; Frank H. Jackson

[57] ABSTRACT

A liquid-metal-cooled fast breeder power reactor is provided with a sealed head access area enclosure disposed above the reactor vessel head consisting of a plurality of prefabricated structural panels including a center panel removably sealed into position with inflatable seals, and outer panels sealed into position with semipermanent sealant joints. The sealant joints are located in the joint between the edge of the panels and the reactor containment structure and include from bottom to top an inverted U-shaped strip, a lower layer of a room temperature vulcanizing material, a separator strip defining a test space therewithin, and an upper layer of a room temperature vulcanizing material. The test space is tapped by a normally plugged passage extending to the top of the enclosure for testing the seal or introducing a buffer gas thereinto.

5 Claims, 3 Drawing Figures

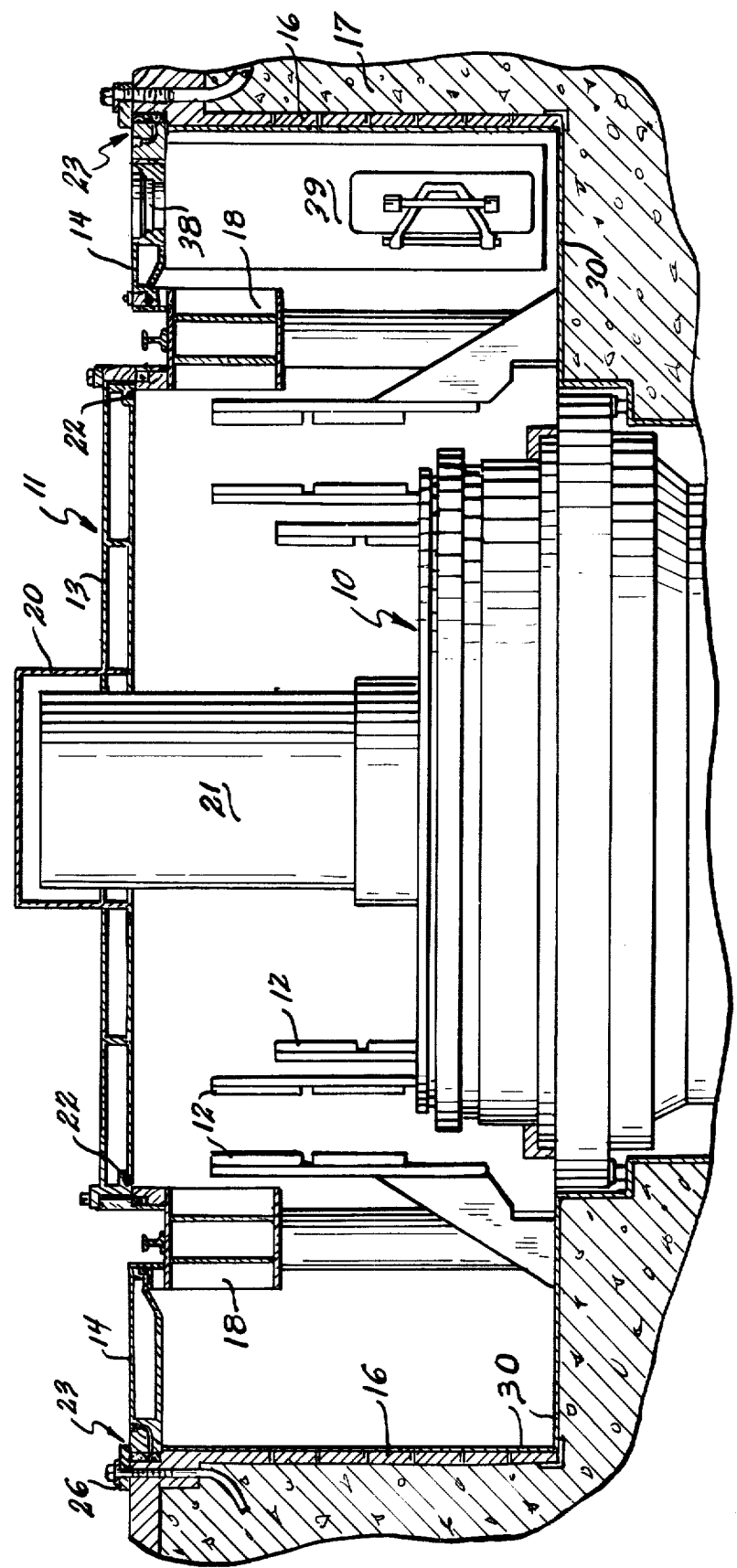

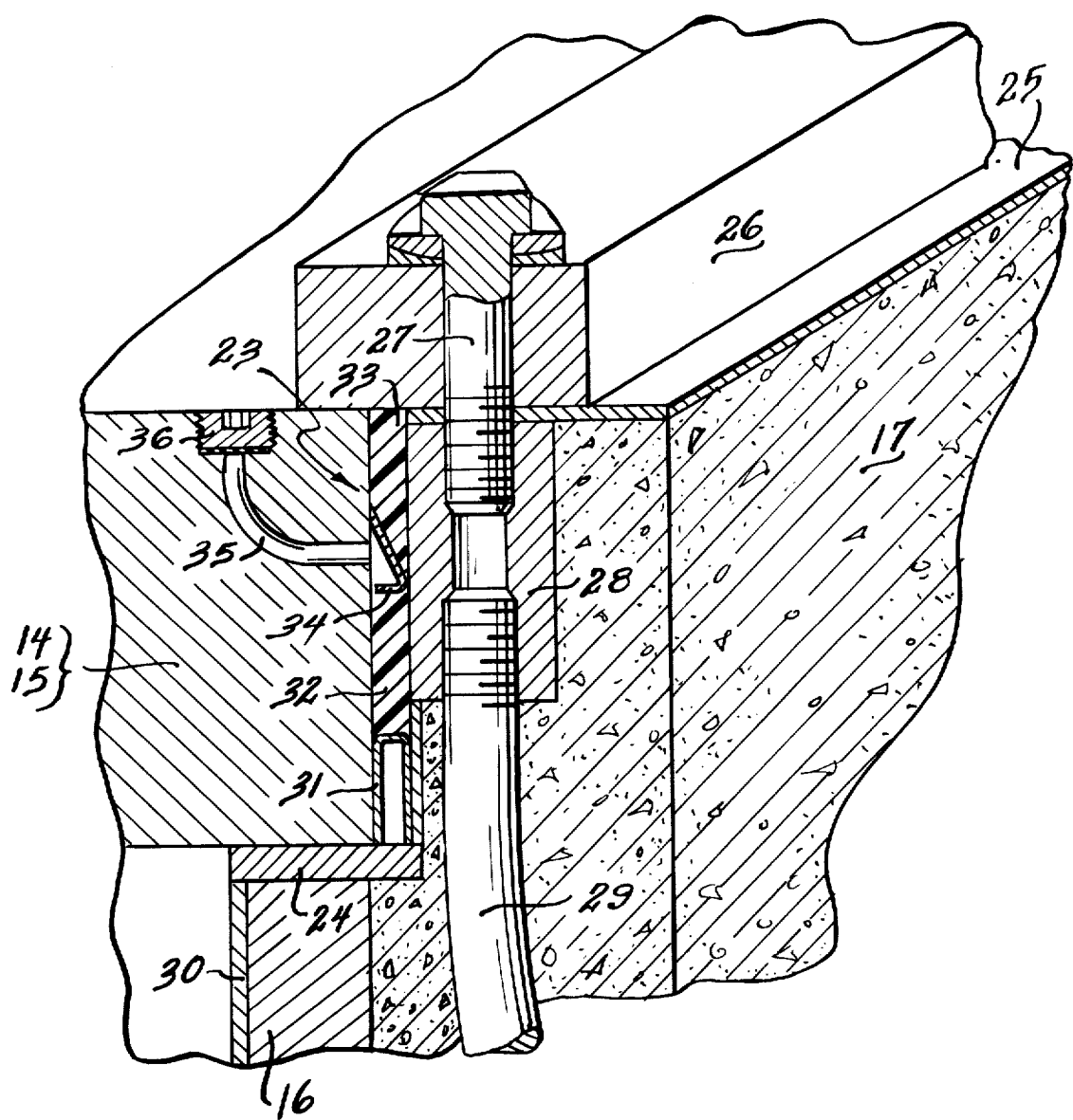

SEALED HEAD ACCESS AREA ENCLOSURE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a sealed head access area (HAA) enclosure for a liquid-metal-cooled fast-breeder power reactor and to a sealant joint for use therein.

It has been postulated that, as a result of a core disruptive design basis accident, some sodium and gaseous products from the reactor would egress from the reactor vessel into the reactor containment building which consequently would become heavily contaminated with radioactivity. If such a contingency is deemed a credible accident a guard enclosure sealing the volume immediately above the reactor vessel head from the remainder of the containment vessel would be indicated. The sealed HAA enclosure would provide the environment, structural support and access to the reactor for electrical wiring, gas plumbing, refueling, inspection surveillance and maintenance services. The core disruptive accident effects of the accident may cause a pressurization of the sealed HAA due primarily to sensible heat from the reactor. The sealed HAA must contain any egress products under this pressurization condition. In addition to this primary function, the sealed HAA must be compatible with other reactor components and operations.

The present invention will be described herein specifically as applied to the Clinch River Fast Breeder Reactor. The specific embodiment of the invention disclosed is a parallel design option for that reactor and may not be actually incorporated in the plant as built.

SUMMARY OF THE INVENTION

In accordance with the present invention, a liquid-metal-cooled fast breeder power reactor is provided with a sealed head access area enclosure disposed above the reactor vessel head consisting of a plurality of prefabricated structural panels including a center panel removably sealed into position with inflatable seals, and outer panels sealed into position with semipermanent sealant joints. The sealant joints are located in the joint between the edge of the panels and the reactor containment structure and include from bottom to top an inverted U-shaped strip, a lower layer of a room temperature vulcanizing material, a separator strip defining a test space therewithin, and an upper layer of a room temperature vulcanizing material. The test space is tapped by a normally plugged passage extending to the top of the enclosure for testing the seal or introducing a buffer gas thereinto.

BRIEF DESCRIPTION OF THE FIGURES

FIG. 2 is a vertical section thereof taken in the direction of the arrows 2—2 in FIG. 1, and FIG. 3 is a detail sectional view of the novel sealant joint.

DETAILED DESCRIPTION OF THE INVENTION

Figure 1:
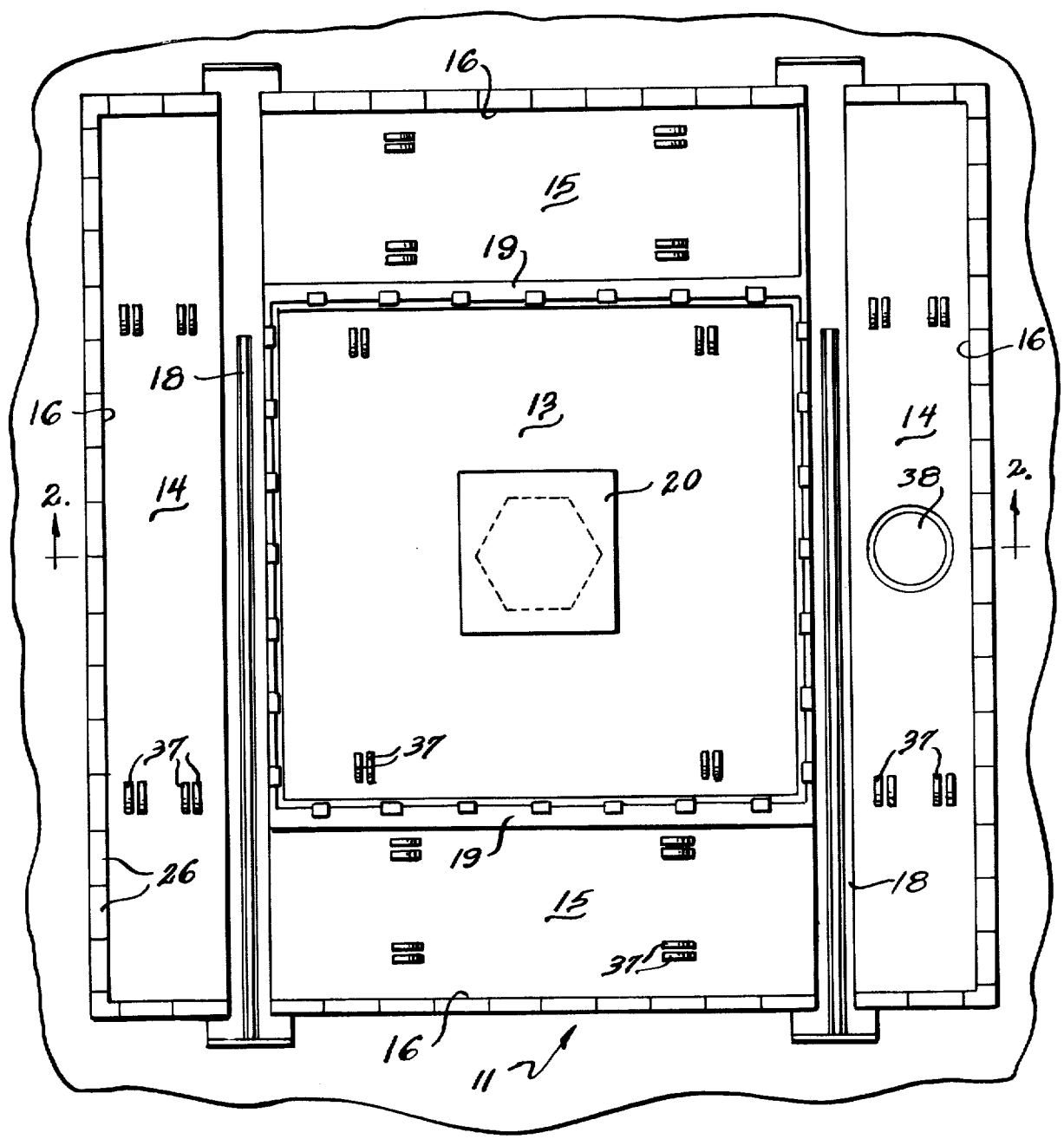
FIG. 1 is a top plan view of the sealed head access area enclosure according to the present invention.

As shown in the drawing the area immediately above the reactor vessel head 10 of a liquid-metal-cooled fast breeder reactor is sealed off from the atmosphere of the reactor containment building by a sealed head access area (HAA) enclosure 11. The major items within the HAA (mostly not shown) include:

1. The control rod drive mechanisms (CRDMs) and secondary control rod drive mechanisms (SCRDMs) with their associated shielding and seismic support.
2. The in-vessel transfer machine (IVTM) (during refueling).
3. The IVTM port.
4. The ex-vessel transfer machine (EVTM) and gantry (at operating floor level, above the HAA, during refueling).
5. The EVTM port, floor valve and adaptor.
6. The EVTM gantry rails and supports.
7. The upper internals structure (UIS) jacks for raising the UIS prior to plug rotation.
8. Specimen port for surveillance specimens.
9. Cable handling units to provide electrical and gas services.
10. Power and signal cabling and gas purge, buffer, seal inflations and cooling lines.
11. Electrical and gas service cabinets and junction boxes.
12. Cable ways and piping from wall penetrations to cabinets and cabinets to junction boxes and destinations.
13. Head heating and cooling system.
14. Liquid level monitors (LLMs).
15. Preamplifier for the flux monitor.
16. Ventilation ducts.
17. Rotating plug risers.
18. Rotating plug drive units.

The rotating plug risers 12 are shown in the drawing.

The sealed HAA enclosure includes five prefabricated, horizontal, structural panels — a square center panel 13, two long side panels 14 and two short end panels 15 — overlying the reactor vessel head 10. Side panels 14 are supported at their outer edges by walls 16 of the head access area which constitute part of the concrete containment structure 17 of the reactor and at their inner edges by the ex-vessel transfer machine (EVTM) track support structure 18. End panels 15 are supported at their outer edges by walls 16, on their short ends by track support structure 18, and at their inner edges by track support structure 18 by means of beams 19 formed as an integral part of the panels 15. Center panel 13 is supported on two sides by track support structure 18 and on two sides by beams 19. Center panel 13 includes a box structure 20 to accommodate the secondary control rod system wiring and plumbing envelope 21.

Center panel 13 has a double inflatable seal 22 around its bottom edge sealing the panel to the track support structure 18 and to beams 19. This type of seal permits easy removal and installation of the center panel and such removal and reinstallation is necessary for each refueling operation. The inflatable seals do not require a precision machined surface which would be difficult to attain in this application.

Outer edges of side and end panels 14 and 15 are sealed to containment structure 16 by novel seals 23 shown in detail in FIG. 3. The outer edges of the side and end panels are secured to the shoulder 24 formed between the HAA walls 16 and the reactor operating floor 25 by clamp bar 26 and bolts 27 which screw into anchor fittings 28 which also receive anchors 29 embedded in the concrete containment structure 17. The inner edges of the side panels 14 and the short edges of the end panels 15 are bolted to the track support structure 18. Bolts also secure the center panel 13 to beams 19 of end panels 15. The two edges of the center panel 13 which are supported on the track support structure 18 are bolted thereto. The HAA enclosure 11 has a continuous sealed steel liner 30 covering the concrete walls and floor of the HAA to protect the concrete from a possible sodium-concrete reaction.

Seals 23 are located in a one-inch wide space between a side or end panel 14 or 15 and shoulder 24 of the containment structure. Seal 23 includes an inverted U-shaped, sheet metal strip 31 constituting a sealant stop running lengthwise along the bottom of this space. The space above stop 31 is filled with a bottom layer 32 of a resilient material, e.g. a room temperature vulcanizing material such as a silicone or other rubber or plastic calking compound. Bottom layer 32 is separated from a top layer 33 of the same or a similar material by a sealant separator 34 consisting of a sheet metal V-shaped strip lying on its side running the full length of the joint and defining a test space within the V. The clamp bar 26 which holds the enclosure down to the containment structure shoulder 24 also covers the seal 23 to prevent blowout of the sealant. A passage 35 extends from the open space within the separator strip 34 to the top of the enclosure 11. A plug 36 is provided therefor flush with the top of the enclosure.

Included in the design as shown are lifting lugs 37 on the panels and a personnel airlock into the HAA including round submarine-type hatch 38 in the enclosure side panel 14 interlocked with a large rectangular inner hatch 39 located in the airlock cylindrical wall.

The function and operation of seals 23 will next be described in some detail as these seals constitute an important feature of the present invention. In operation seals 23 will prevent escape of radioactive material from the HAA should a core disruptive accident occur releasing radioactive material into the HAA. While the side and end panels 14 and 15 of the HAA enclosure are not routinely removed at any time during the life of the reactor, they must be removable for necessary maintenance to the elements accessible from within the HAA. To remove panels 14 and 15 a conventional, commercially available reciprocating saw can be used to cut down through the seal the entire length thereof following removal of the clamp bar 26. It will be at once apparent that inverted U-shaped bottom strip 31 is essential so that a clean cut through all of the sealant material can be made. After both sealant layers, the sealant separator and the bottom strip are cut off the panel can be lifted using a crane and lifting lugs 37 on the panel.

Separator strip 34, passage 35 and plug 36 are provided to make the seal "testable" — that is, to make it possible to test on a routine basis whether the seal is functioning properly. The space inside separator strip 34 is filled with compressed air and the rate of decay of the pressure measured to determine whether the seal is still functioning properly.

Separator strip 34 and passage 35 may also be utilized for the introduction of a buffer gas under pressure into the seal. Such a buffer gas, being at a higher pressure than the atmosphere in HAA, would help to prevent leakage out of the HAA. In addition provision could be made for continuously purging a gas within the test space within separator strip 34 thereby eliminating any radioactive gases which may have leaked or diffused through the seal.

This seal does not require accurate closely machined fitting joint members, not does it require any fine surface finishes. Ordinary fabrication and construction methods can be used. Flame cut surface finishes would suffice. The depth and width of the joint gap is not critical and can be designed for almost any relatively large size joint.

The design of the seals 23 permits thermal expansion of the enclosure during an incident without impairing the sealing capacity. This is because the sealant is resilient and the strips 31 and 34 are crushable.

The embodiments of the invention in which an exclusive property or privilege is claimed are defined as follows:

1. In a liquid-metal-cooled fast-breeder power reactor including a reactor vessel having a head, said reactor vessel being surrounded by a concrete containment structure, the improvement comprising a sealed head access area enclosure disposed above the reactor vessel head, said enclosure including a center panel immediately overlying the reactor vessel head and a plurality of outer panels disposed around the center panel, means for supporting the center panel and the inner edges of the outer panels, the outer edges of the outer panels being supported by the containment structure, means for removably sealing the center panel to said support means for routine removal during refueling and means for semipermanently sealing the outer panels to the concrete support structure for removal only during nonroutine maintenance.

2. In a liquid-metal-cooled fast breeder power reactor including a reactor vessel having a head and a pair of parallel invessel transfer machine rail support structures disposed on opposite sides of the reactor vessel, said reactor vessel being surrounded by a concrete containment structure, the improvement comprising a sealed head access area enclosure disposed above the reactor vessel head, said enclosure including a square center panel immediately overlying the reactor vessel head surrounded by two long side panels and two shorter end panels, each of said panels being disposed horizontally and being prefabricated of structural steel, means for semipermanently sealing the outer edges of the end and side panels to the containment structure, these edges of the panels being supported thereby, means for semipermanently sealing the inner edges of the side panels and the short edges of the end panels to the invessel transfer machine support structure, these edges being supported thereby, the inner edge of the end panels consisting of a support beam extending between the invessel transfer machine support structures, the center panel being removably sealed on two sides to the invessel transfer machine support structure and on the other two sides to the support beams of the end panels for routine removal during refueling.

3. The improvement according to claim 2 wherein the center panel is removably sealed in position with inflatable seals.

4. The improvement according to claim 2 wherein the outer panels are semipermanently sealed in position with seals located in a narrow space between the edge of the panel and the containment structure, said seals including from bottom-to-top an inverted U-shaped strip, a lower layer of a room temperature vulcanizing material, a separator strip defining a test space therewithin and an upper layer of a room temperature vulcanizing material, and a tap leading from the test space to the top of the enclosure.

5. In a liquid-metal-cooled fast breeder power reactor including a reactor vessel having a head, said reactor vessel being surrounded by a concrete containment structure, the improvement comprising a sealed head access area enclosure disposed above the vessel head and supported by the containment structure, the enclosure being sealed to the containment structure by seals disposed in a narrow space between the edge of the enclosure and the containment structure, said seal consisting of from bottom-to-top, an inverted U-shaped strip, a lower layer of a room temperature vulcanizing material, a separator strip defining a test space therewithin and an upper layer of a room temperature vulcanizing material.

* * * * *